Figure 1:
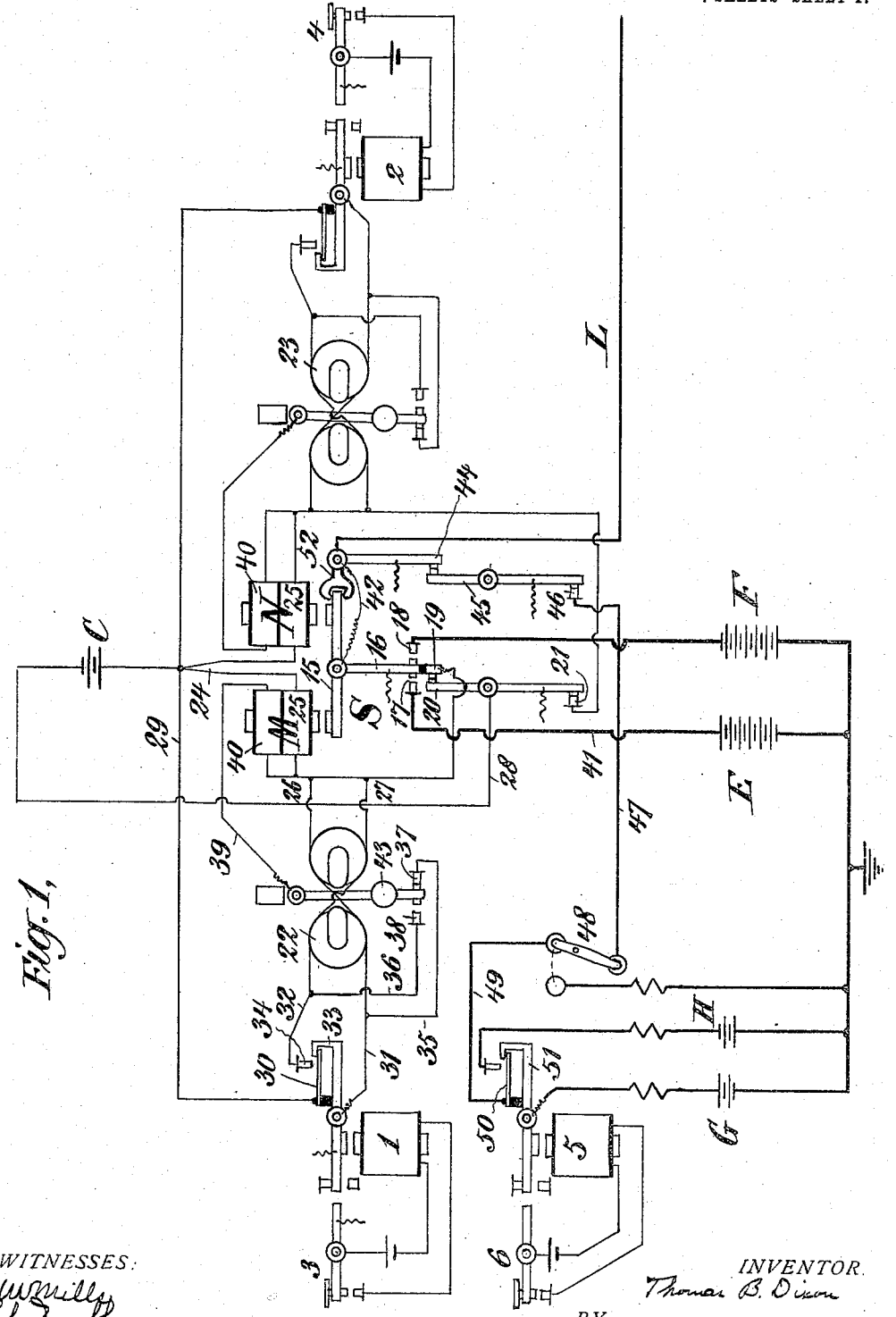

T. B. DIXON.
TELEGRAPH SYSTEM AND APPARATUS.
APPLICATION FILED NOV. 25, 1904. RENEWED MAR. 5, 1909.

939,401.

Patented Nov. 9, 1909.

7 SHEETS—SHEET 1.

WITNESSES:

INVENTOR.
Thomas B. Dixon
BY
ATTORNEYS

T. B. DIXON.
TELEGRAPH SYSTEM AND APPARATUS.
APPLICATION FILED NOV. 25, 1904. RENEWED MAR. 5, 1909.

939,401.

Patented Nov. 9, 1909.
7 SHEETS—SHEET 2.

T. B. DIXON.
TELEGRAPH SYSTEM AND APPARATUS.
APPLICATION FILED NOV. 25, 1904. RENEWED MAR. 5, 1909.
939,401.
Patented Nov. 9, 1909.
7 SHEETS—SHEET 6.
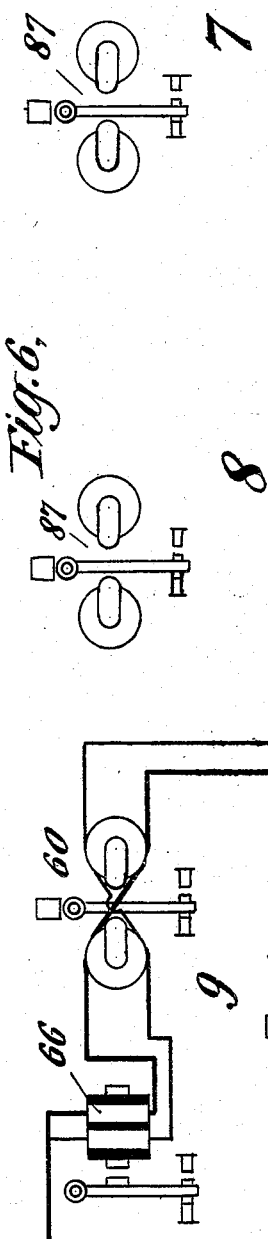
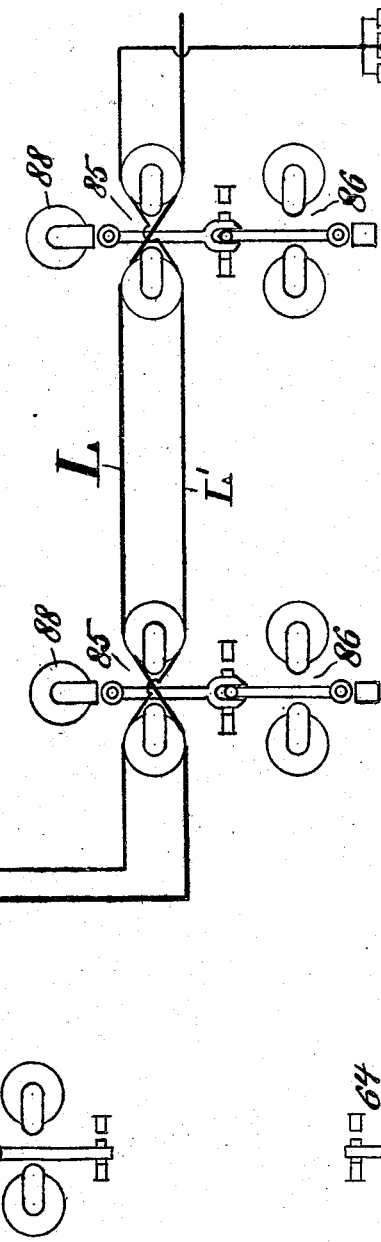
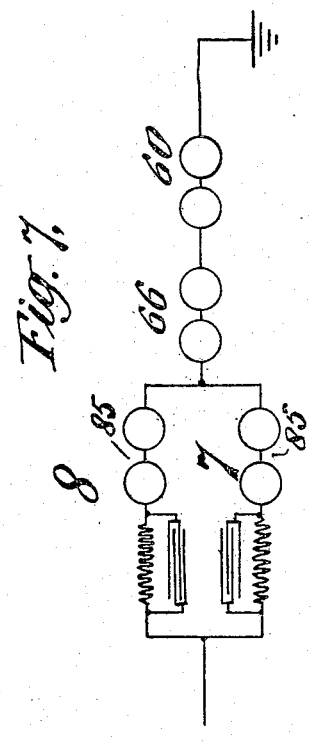
Fig. 6.
Fig. 7.
WITNESSES:
INVENTOR.
Thomas B. Dixon
BY
Chapin Haywood & Marble
ATTORNEYS

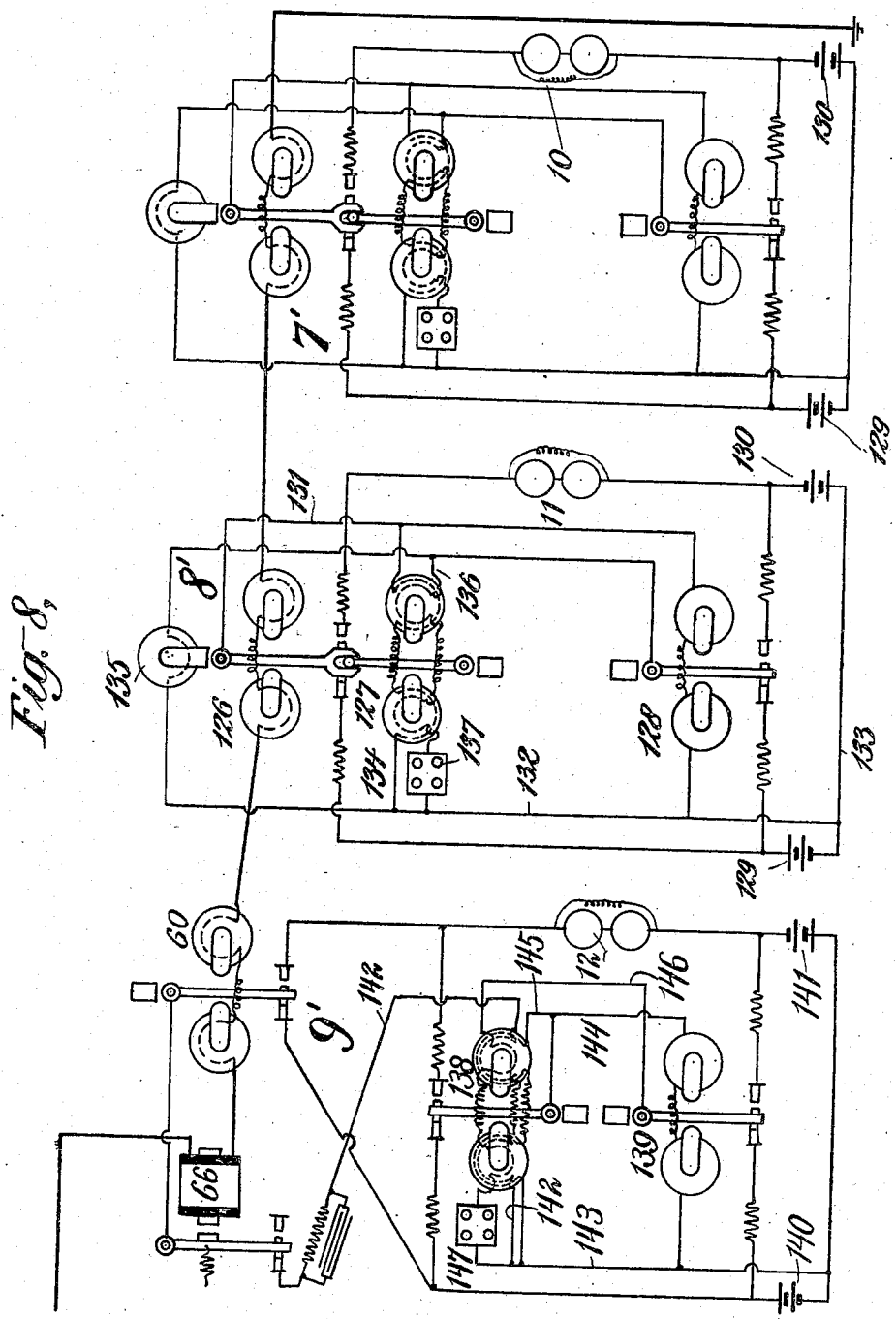

UNITED STATES PATENT OFFICE.

THOMAS BULLITT DIXON, OF NEW YORK, N. Y.

TELEGRAPH SYSTEM AND APPARATUS.

939,401.             Specification of Letters Patent.      Patented Nov. 9, 1909.

Application filed November 25, 1904, Serial No. 234,128. Renewed March 5, 1909. Serial No. 481,540.

*To all whom it may concern:*

Be it known that I, THOMAS B. DIXON, a citizen of the United States, residing in the city of New York, borough of Manhattan, county of New York, and State of New York, have invented certain new and useful Improvements in Telegraph Systems and Apparatus, and do hereby declare the following to be a full, clear, and exact description of the same, such as will enable others skilled in the art to which it pertains to make and use the same.

My invention relates generally to signaling systems, and particularly to improvements in systems of multiplex telegraphy, whereby a plurality of distinct and separate messages may be transmitted simultaneously over a single wire or conductor.

My invention embodies certain improvements over a similar system of multiplex telegraphy set forth in my Patent No. 778,177, dated December 20, 1904. In the system of that patent, two messages are transmitted simultaneously in one direction by means of electric pulses occurring in pairs, each pair of pulses producing a separate signal, the pulses by which one message is transmitted being positive, and the pulses by which the other message is transmitted being negative. I have further shown in said patent, that by combining such method of simultaneous transmission in one direction, with a well known method of transmitting messages simultaneously in opposite directions, four messages may be transmitted simultaneously over a single line or conductor.

In the system herein described, I show means whereby, in addition to the transmission of two messages simultaneously in one direction, a third message may also be transmitted over the same circuit and in the same direction simultaneously with the other two. I further show how an equal number of messages may be transmitted simultaneously in the opposite direction.

My invention further comprises certain improvements in the apparatus employed for transmitting messages according to the system set forth in my said former patent and improvements in apparatus for receiving such messages.

The objects of my invention are, first, to improve multiplex signaling systems, and particularly multiplex systems of telegraphy; second, to transmit simultaneously three messages over the same circuit and in the same direction without interference; and to transmit an equal number of messages in the opposite direction over the same circuit, also without interference; third, to improve and simplify the apparatus and circuits of multiplex telegraph systems, and particularly of the system set forth in my said prior patent No. 778,177; and fourth, to produce a multiplex telegraph system capable of transmitting three messages in one direction and a corresponding number of messages in the opposite direction, which shall be simple, shall not require the use of instruments of unusual and untried types, which shall possess a wide working margin, which shall not require the use of alternating currents or currents of excessively high potential, which shall be relatively little subject to inductive disturbance and the like, which shall be capable of high speed of operation and which may be readily comprehended by telegraph electricians of ordinary ability. These objects are attained in the system of multiplex telegraphy herein described and illustrated in the drawings which accompany and form a part of this specification, in which—

Figure 2:
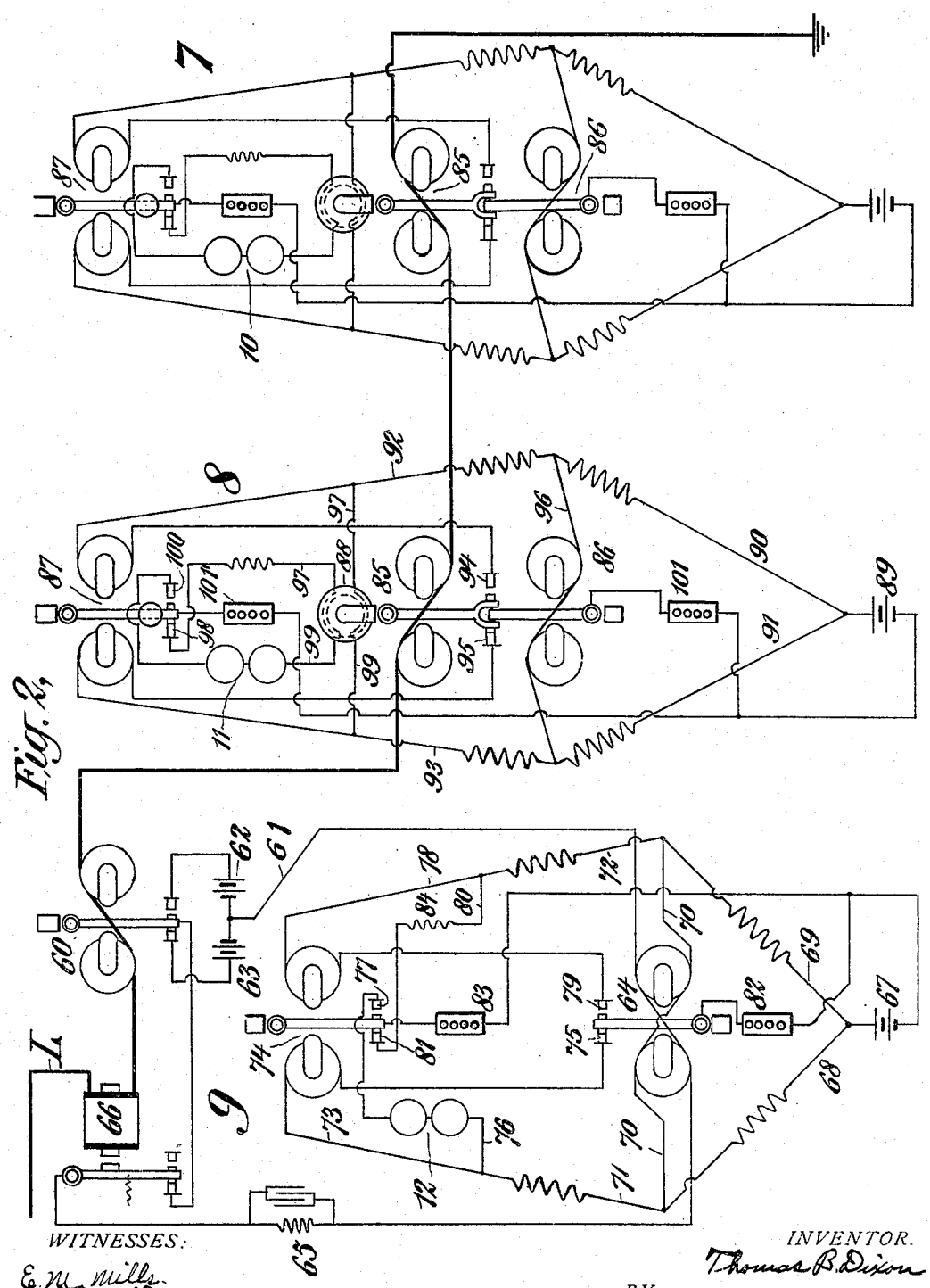
Figure 3:
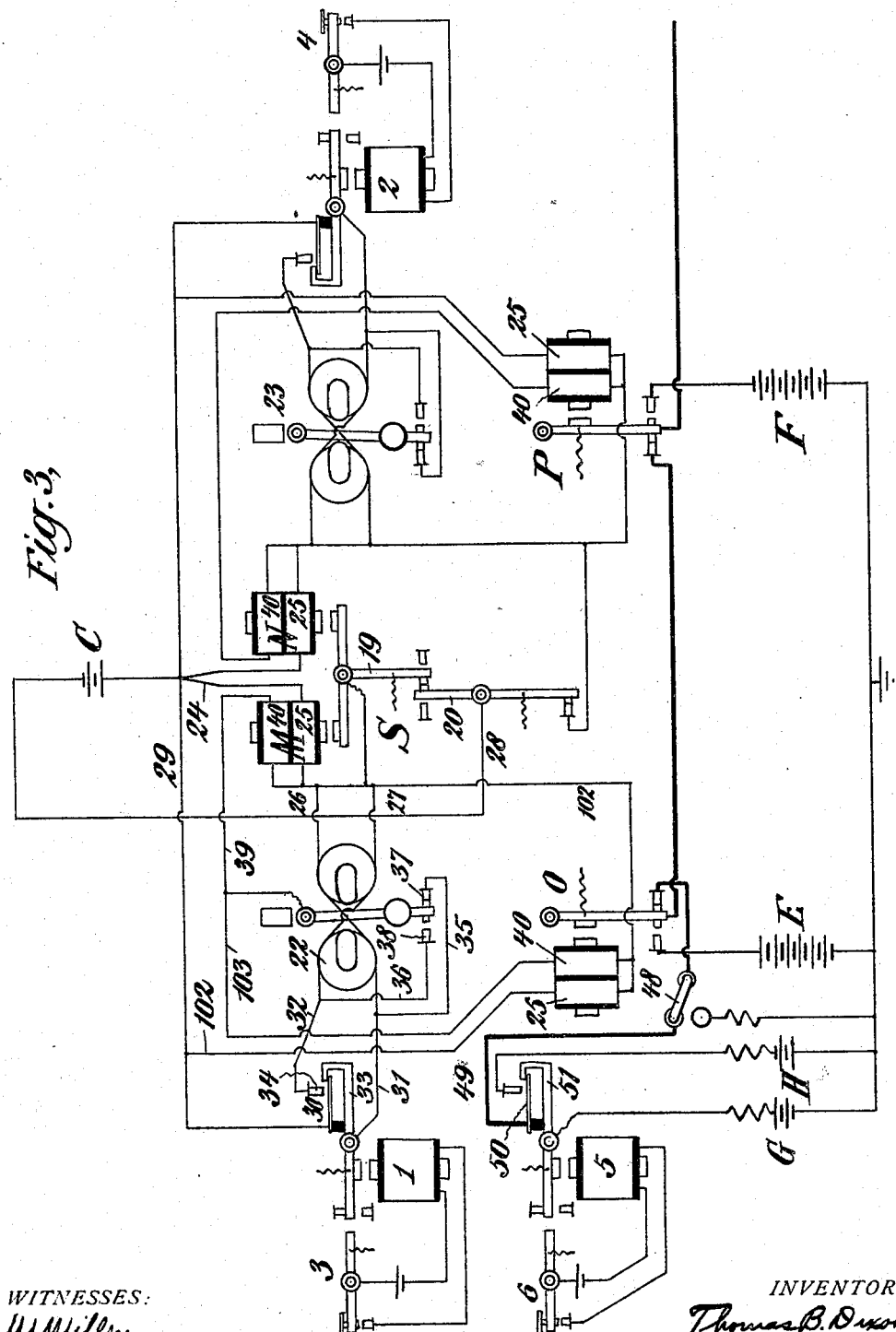
Figure 4:
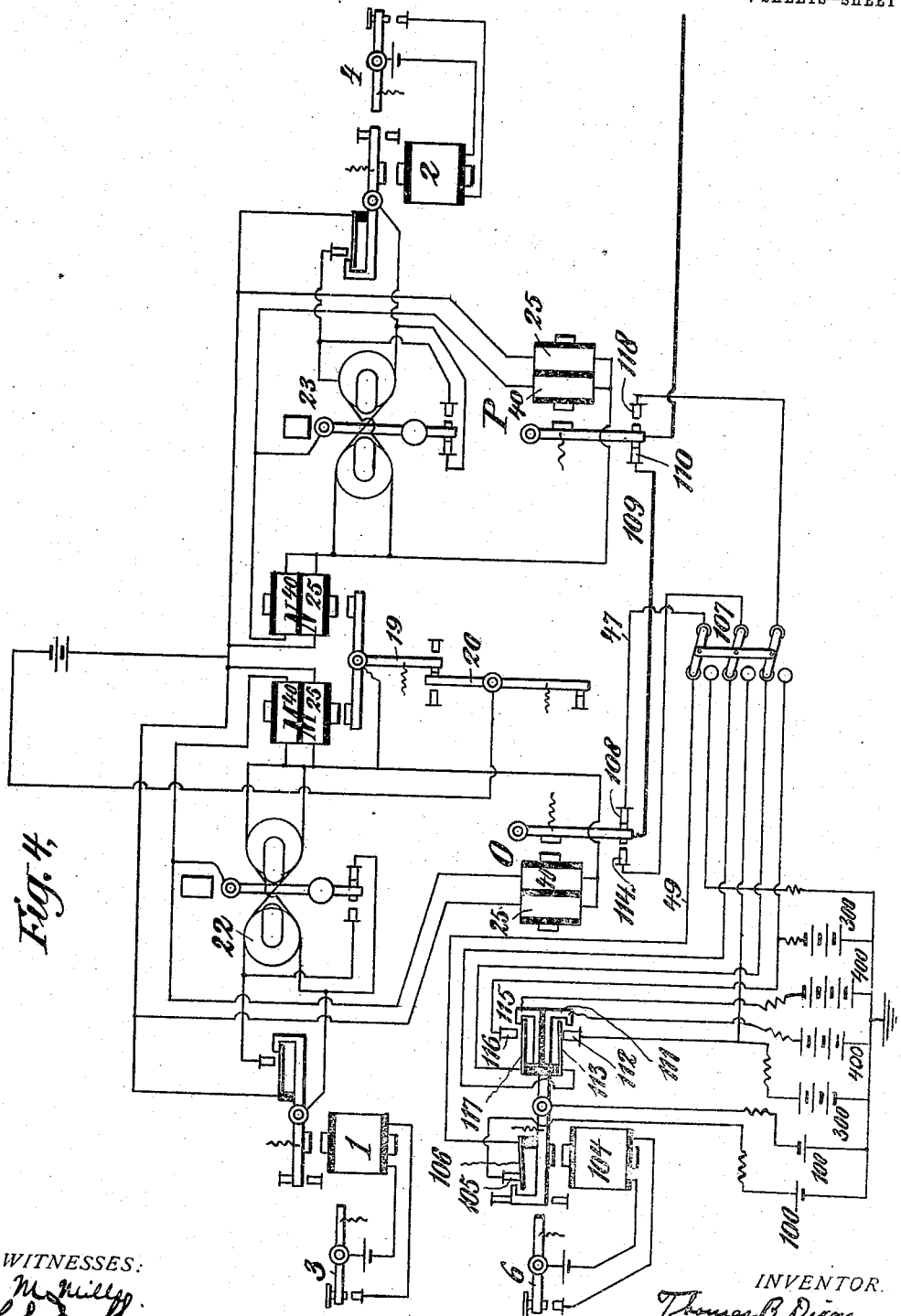
Figure 5:
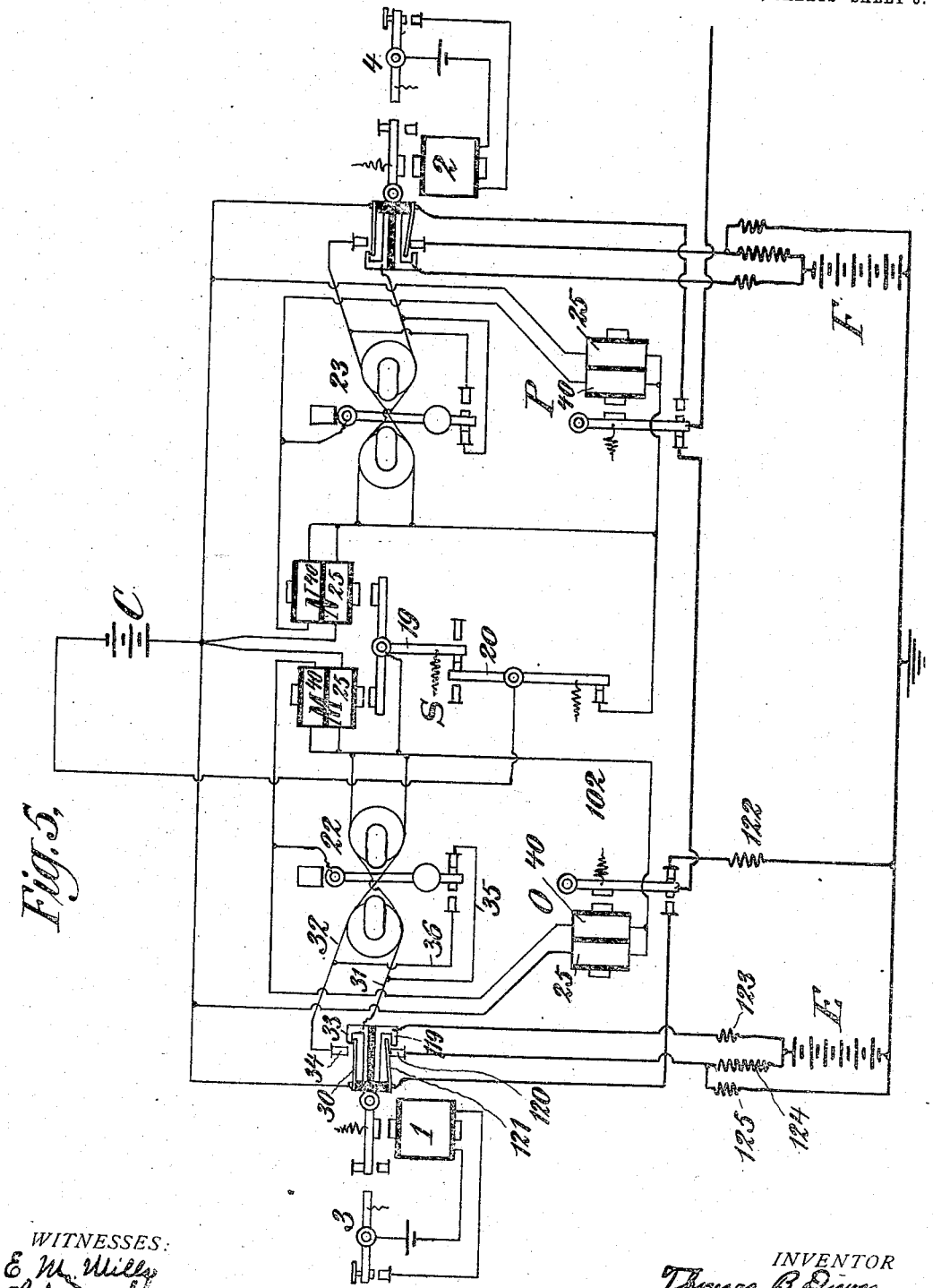

Figure 1 is a diagram illustrating one arrangement of transmitting apparatus which may be employed at one end of a triplex or sextuplex line, and Fig. 2 is a diagram illustrating one arrangement of receiving apparatus adapted for use in connection with such transmitting apparatus, these two figures in fact forming one continuous diagram. Fig. 3 is a diagram similar to Fig. 1 and illustrates an alternative arrangement of transmitting apparatus. Fig. 4 is another diagram similar to Fig. 1 and illustrates a further alternative arrangement of transmitting apparatus. Fig. 5 is another diagram illustrating transmitting apparatus, and in particular illustrating the use of the well-known "leak" in my system, to automatically correct for loss of a pulse. Fig. 6 is a skeleton diagram illustrating one method of duplexing my receiving apparatus to permit transmission and reception of messages in both directions. Fig. 7 is another skeleton diagram illustrating an alternative arrangement of the line relays of the receiving apparatus, in the line circuit. Fig. 8 illustrates an alternative form of receiving apparatus which may be employed.

In the following description, I will describe particularly the method of transmitting three messages simultaneously in the same direction over a single conductor. It is well known, and will appear from the description and drawings herein, that such a system is capable of being "duplexed" to transmit a similar number of messages in the opposite direction simultaneously.

One of each set of three transmitters of my system is arranged, when operated, to send over the line, at the beginning, and again at the end, of each signal, a current pulse of positive direction, the corresponding receiving instrument being arranged to be changed from normal condition by the first of such pulses and to be restored to normal condition by the second of such pulses. A second transmitter and its corresponding receiver operate in the same manner, except that the transmitter produces, and the receiving instrument is operated by, negative current pulses. The third of such set of transmitters operates according to the well known current reversal or "double current" method of transmission, producing in the line currents of less strength than those produced by the other two transmitters. Means are provided whereby mutual interference in the simultaneous transmission of signals from the three transmitters is avoided.

Referring now to the drawings, and at first to Figs. 1 and 2, which form one continuous diagram, numerals 1 and 2 designate two similar transmitters of well known type, of which transmitter 1 is arranged as hereinafter shown to produce in the line, at the beginning, and again at the end, of each signal, a brief current pulse of positive direction, and transmitter 2 is arranged similarly, to produce a brief current pulse of negative direction. By suitable selecting devices hereinafter described, I avoid all interference between these two transmitters in case both are operated simultaneously. These transmitters are controlled by keys 3 and 4 and suitable local circuits, in the ordinary manner.

5 in the drawings, represents the third transmitter, controlled by a key 6, and arranged when operated, to reverse the direction of current in the line at the beginning, and again at the end, of each signal.

L designates a line conductor connecting the three transmitting instruments with three receiving instruments 7, 8 and 9, corresponding respectively to transmitters 1, 2 and 5. The construction of these receiving instruments will be described in detail later. Receiving instrument 7 is arranged, upon the transmission through the line of a positive pulse, to close the circuit of a sounder 10, and upon the transmission of a second positive pulse, to break the circuit of said sounder. Receiving instrument 7, however, is not affected by negative currents, nor by the relatively weak currents produced in the line by the operation of transmitter 5. Similarly, receiving instrument 8 is arranged upon the transmission of a brief negative pulse of suitable strength, to close the circuit of sounder 11, and upon the transmission of a second negative pulse of similar strength, to break the circuit of such sounder. Instrument 8 however, is not affected by positive current pulses, nor by the relatively weak currents sent into the line by transmitter 5. Instrument 9 is in effect a polar relay, operated by the reversal of the line current, and operating a sounder 12. Means hereinafter described are provided, so that this instrument is not affected by the brief current pulses which effect the operation of instruments 7 and 8.

Referring now to the transmitting instruments, S is a selecting instrument by means of which interference between the operation of transmitters 1 and 2 is avoided. It comprises two differentially wound magnets M and N, and a walking beam 15 carrying armatures for said magnets and connected to a contact lever 16 playing between contact stops 17 and 18. Said contact lever has also an insulated contact piece 19 normally in contact with a contact lever 20, which lever is also normally in contact with a contact stop 21. Levers 16 and 20 are provided with suitable opposing retractile springs, which normally hold lever 16 in an intermediate position, out of contact with stops 17 and 18.

C is a local battery supplying current for the operation of the selecting instrument and relays 22 and 23. From the positive pole of said battery four conductors diverge, two of which serve transmitter 1, and two transmitter 2. It is necessary to describe only the circuits of and relating to transmitter 1, as the circuits of transmitter 2 are similar. Starting from the positive pole of battery C, one conductor 24 passes through the lower coil 25 of magnet M to 26, to 27, to contact piece 19, to contact lever 20, and thence through wire 28 to the negative pole of battery C. Another wire 29 from the positive pole of battery C is connected to the contact tongue 30 of transmitter 1. From thence the circuit passes through a conductor 31 or a conductor 32, according as said tongue 30 is in contact with the armature hook 33, or with the contact stop 34. Conductors 31 and 32 pass through opposing coils of relay 22 to points 26 and 27, and then join the circuit from coil 25 of magnet M already described, to the negative pole of battery C. It will be seen that the result of operating key 3, and so causing the armature of transmitter 1 to rise and fall, is to complete a circuit from battery C first through one coil of relay 22, and then through the other, thus causing the armature of that relay to vibrate.

Branch wires 35 and 36 connect conductors 31 and 32 to the two stops 37 and 38 of relay 22. The armature of this relay is connected by conductor 39 to the second or neutralizing coil 40 of magnet M and thence to point 26, and so to the negative pole of battery C.

Coils 40 and 25 of magnet M normally neutralize each other, both of these coils being normally in a closed circuit. But when key 3 is depressed, the armature of relay 1 is attracted, and the armature of relay 22 is caused to shift from one side to the other, and there is an instant, while the armature of relay 22 is moving, when coil 40 of magnet M is deënergized. Coil 25 then attracts its armature, causing contact lever 16 to move to the left and make contact with stop 17, and thereby placing to the line battery E as follows:—From ground through battery E and wire 41 to stop 17, contact lever 16, and conductor 42 to the line wire L. Battery E is to the line only during the brief instant while the armature of relay 22 is moving from right to left. This interval, however, may be adjusted by adjusting the position of a suitable weight 43 on the armature of said relay and also by moving the usual contact stops, indicated diagrammatically, in and out in the ordinary manner. As soon as said armature reaches stop 38, the circuit through coil 40 is again complete, and the spring of contact lever 20 moves contact lever 16 back to its normal intermediate position, breaking the circuit through battery E. When key 3 is released however, the armature of relay 22 will be caused to move back from left to right, again breaking the circuit of coil 40, and causing battery E to be placed to the line again for an instant.

If key 4 of transmitter 2 be depressed, its relay 23 and magnet N will be operated in similar fashion to cause battery F to be placed to the line for an instant when key 4 is depressed, and again when key 4 is released. Contact lever 20 and walking beam 15 constitute the particular means by which interference between the operation of the transmitters is avoided. It will be noted that when magnet M attracts the walking beam, the circuit from battery C through transmitter 2 and coil 25 of magnet N are broken at 21; and correspondingly, that when magnet N attracts the walking beam 15, the circuits from battery C through transmitter 1 and coil 25 of magnet M are broken at 19. One of the two magnets M and N, (M, for example,) is placed closer to its armature than the other, so as to have an advantage. If, therefore, keys 3 and 4 be operated simultaneously, magnet M, being assumed to be closer to the walking beam than magnet N, will attract the walking beam first and cause battery E to be placed to the line momentarily, after which, magnet M ceasing to attract the walking beam, the latter will return to its intermediate position, and magnet N will attract said walking beam, causing battery F to be placed to the line momentarily. The intervals of time during which batteries E and F are to the line being merely the intervals during which the armatures of relays 22 and 23 are moving, are very much shorter than the shortest dot which a telegraph operator produces, and therefore, there is ample time for the placing of both batteries to the line successively during the shortest dot.

Batteries E and F are of equal strength and potential, but are connected oppositely, so that the one will produce positive currents and the other negative currents in the line.

Line conductor L, when not connected to batteries E and F, is connected to ground through contact lever 44, a contact arm 45 similar to arm 20, a contact stop 46, a wire 47, a two-pole switch 48 and a wire 49 leading to the contact tongue 50 of transmitter 5. When the armature of this transmitter is up, the line circuit is complete to ground through the armature hook 51, and battery G. When the armature of said transmitter is down, the line circuit is complete to ground through battery H. Batteries G and H are of similar strength and potential, but are oppositely connected. They are also of much lower potential than batteries E and F. Contact lever 44 is connected by a yoke-shaped connecting piece 52, to walking beam 15, the connection being such that when said walking beam moves to place either battery E or battery F to the line momentarily, the extension of the line circuit through transmitter 5 is broken either between 44 and 45 or at 46, prior to the placing of battery E or battery F, as the case may be, to the line, the connection of transmitter 5 to the line being restored as soon as battery E or battery F has been disconnected from the line again.

Contact levers 44 and 46 are provided with suitable retractile springs, which, like the retractile springs of arms 16 and 20, oppose each other, and so tend to hold the contact levers in the intermediate position shown in which a circuit is completed from 44 through 45 to 46.

The function of the double pole switch 48 is to connect the line to ground, in case it is desired to cut out transmitter 5. The effect of throwing switch 48 from the position shown to the opposite direction, is to cut out said transmitter 5.

Referring now to the receiving instruments 7, 8 and 9, before describing these instruments particularly, it is proper to state that each of them is a modification of, and comprises an improved arrangement of circuits of, the form of polar relay described in U. S. Letters Patent granted to me on May 19, 1896, No. 560,313; the peculiar advantage of which relay over ordinary polar relays being that the current which completes the operation of it is a local and continuous current, while the primary actuating current may be either continuous or pulsatory.

I will first describe the receiving instrument 9 which responds to prolonged reversals of line polarity due to the operation of transmitter 5, but does not respond to the brief pulsatory currents produced in the line by the operation of transmitters 1 and 2, no matter what the direction of such pulsatory currents may be. Instrument 9 is of the nature of a relay, but comprises a plurality of subordinate relays to which separate reference numerals will be given. The actuating element of instrument 9 is a relay 60, located in the line circuit L. Relay 60 is an ordinary polar relay which acts merely as a pole changer to place alternately to the local circuit 61 of instrument 9, two similar but oppositely arranged batteries 62 and 63. Wire 61 leads through one of two opposing magnet coils of polar relay 64, and through rheostat 65, to the armature of a neutral relay 66, also in the line circuit L, and thence through the rear contact of said relay 66 to the armature of polar relay 60. This circuit holds the armature of relay 64 to the left when the armature of relay 60 is to the left, and holds the armature of relay 64 to the right when the armature of relay 60 is to the right. The current through circuit 61 is normally continuous, but may at times become pulsatory in character through the action of relay 66, the function of which is to momentarily interrupt circuit 61 upon the transmission through the line L of pulsatory currents produced by placing battery E or battery F to the line; relay 66 being so adjusted that it does not respond to currents from batteries G and H. The effect of the operation of relay 66 is to prevent mutilation of signals of sounder 12 through the transmission simultaneously of pulses to operate instruments 7 and 8.

Instrument 9 comprises a local battery 67, one pole of which is connected to branch wires 69 and 68 of a Wheatstone bridge, the cross wire 70 of which is connected to the second coil of relay 64. The other wires 71 and 72 of the bridge are each divided, one branch 73 of wire 71 passing through one of two opposing coils of a polar relay 74, and thence to a back stop 75 of relay 64, the other branch 76 from wire 71 including sounder 12 and being connected to a contact stop 77 of relay 74 which will be out of contact with the armature of that relay when said armature is attracted by the magnet coil through which circuit 73 passes. Similarly, the branch 78 of wire 72 passes through the other coil of magnet 74 to a stop 79 of relay 64, and branch 80, which includes a resistance to balance that of the sounder, passes to a stop 81 of relay 74, with which stop the armature of that relay will be out of contact when said armature is attracted by the coil through which wire 78 passes. The armatures of relays 64 and 74 are connected to return through suitable resistances 82 and 83, respectively. The arms 68, 69, 71 and 72 of the Wheatstone bridge include the usual resistances.

Considering now the circuits of the Wheatstone bridge, normally there is a circuit from battery 67 through conductors 68, 71 and 73 of the bridge, one coil of relay 74, by which coil the armature of said relay is held to the left normally, and the left contact stop 75 of relay 64, the armature of that relay, and resistance 82 to return, and thence to battery. There is also another circuit from battery 67 through wires 69, 72 and 80 of the Wheatstone bridge, the left-hand stop 81 of relay 74, the armature of that relay, and rheostat 83 to return and then back to battery. There is no current through branch 78 of the Wheatstone bridge normally, this branch being broken at 79; nor is there any current normally through branch 76, this branch being broken at 77. Supposing, as should be the case normally, that the resistances in the branches 68, 69, 71 and 72 of the bridge are equal, or in proper proportion, and that rheostat 83 and wire 80 equal the resistance in wire 73, including rheostat 82, it will be apparent that no current will flow through the cross wire 70. The same will be true if the armatures of both relays 64 and 74 are to the right, the balance between the sides of the bridge being the same irrespective of whether the armatures of relays 64 and 74 are to the left or to the right. Under these conditions, the armature of relay 64 will be held normally against its left stop 75 by its natural bias due to the magnetism of its armature plus the effect of the current from battery 63 in circuit 61. If now relay 60 be reversed by reversal of current in the line L, so that battery 62 is placed in circuit 61, the armature of relay 64 will be moved to the right. The instant this armature moves, it breaks contact 75, disturbing the balance of the bridge so that a powerful current flows through the cross wire 70 in the proper direction to assist in moving the armature of relay 64 from left to right. As soon as such armature has reached and made contact with its right hand stop 79, the circuit through conductor 78 of the bridge is completed, the armature of relay 74 is shifted to the right, and as soon as said armature has reached and made contact with its right hand stop 77, a circuit is completed through branch 76, restoring the balance of the bridge, and energizing the magnet of sounder 12.

It will be seen that once the armature of relay 64 has started to move, its motion will continue until the opposite stop is reached, and likewise, the armature of relay 74 will be reversed, notwithstanding a possible second reversal of the armature of relay 60 while these operations are in progress. This is so, because even though, owing to a second reversal of relay 60, the current through circuit 61 fails before the armature of relay 64 has completed its movement, said armature will nevertheless be carried over by the current through cross wire 70 of the bridge. In order to prevent instrument 9 from being affected by induced currents, false currents and the like, the resistance of rheostat 83 may be made somewhat greater than above indicated in order that there may be normally a flow of current through the cross wire 70, tending to hold the armature of relay 64 against whichever stop it is in contact with at the time; such constant current through the cross wire being less than the current from batteries 62 and 63, so that when relay 60 is reversed, relay 64 will also be reversed, notwithstanding such constant current through the cross wire. Conversely, if it is desired to make relay 64 more sensitive, the resistance of rheostat 82 may be increased so that there is normally a current through the cross wire opposing current through conductor 61. In such case, the mere breaking of contact between the armature of the primary actuating relay 60 and one of its stops will cause the reversal of relays 64 and 74 if sufficient resistance in rheostat 82 be employed.

Relay 66 is adjusted so that it does not respond to the relatively weak currents from batteries G and H, but does respond to the stronger current pulses from batteries E and F. When, through operation of transmitter 5, battery H is substituted in the line for battery G, or vice versa, instrument 9 is reversed like an ordinary polar relay; but if while either battery G or H is to the line, either transmitter 1 or transmitter 2 is operated, the armature of relay 66 will be attracted the instant each current pulse from battery E or battery F, as the case may be, passes through the line, thus breaking the circuit of conductor 61 momentarily, and thus preventing the reversal of instrument 9 by the current pulse produced by transmitter 1 or transmitter 2, should that pulse happen to be of opposite polarity to the current from that battery, G or H, which is to the line when the pulsatory current transmitter is operated.

It will be noted that during the time when battery E or battery F is to the line, batteries G and H are both cut out of the line by the opening of one of the two contacts 44 and 46, and hence the current from these batteries cannot oppose the current pulses produced by the operation of transmitters 1 and 2.

Instrument 9 resembles the polar relay illustrated and described in my Patent No. 560,313, and is a modification thereof. Like the relay of my said patent, instrument 9 comprises means whereby the instant the armature of sub-relay 64 begins to move, such movement will be completed even though the current pulse which started the movement ceases before such movement is completed. This permits the operation of the instrument not only by continuous currents but by pulsatory currents as well, provided that such pulsatory currents are not of sufficient strength to actuate relay 66. This is essential since when transmitters 1 and 2 or either of them are operated simultaneously with transmitter 5 the otherwise continuous currents sent into the line by transmitter 5 will become more or less pulsatory in character. By employing the Wheatstone bridge in the circuits of this instrument I am able to obtain a relatively simple and easily adjusted instrument, deriving the current for its local circuit from a single battery, and the sub-relays of which are of a simple character.

Instruments 7 and 8 are arranged, the former to respond only to currents from battery F, the latter to respond only to currents from battery E; and each instrument is arranged to be deflected from normal condition by the first pulse from its battery and to be deflected back to normal condition by the second pulse from its battery. These instruments 7 and 8 are modifications of similar instruments illustrated and described in my said Patent No. 778177, where they are termed "single-direction double-current relays." Each such instrument comprises three sub-relays 85, 86 and 87, 85 being the main relay through which the line current passes, 86 a secondary relay actuated by a local circuit, and 87 being a reversing relay corresponding in function to relay 74 of instrument 9. The armatures of relays 85 and 86 are preferably connected mechanically so as to move together, and relay 85 has an electro-magnet 88 for magnetizing its armature, the direction of the current through which, and therefore the polarity of the armature of relay 85, is arranged to be reversed by the action of reversing relay 87. Only the local circuits of instrument 8 will be described, as those of instrument 7 are similar. Current for these local circuits of instrument 8 is supplied from battery 89, from one pole of which the branches 90 and 91 of a Wheatstone bridge diverge. The other branches 92 and 93 of said bridge pass respectively through opposing magnet coils of relay 87 to opposing contact points 94 and 95 of the relays 85 and 86. The magnet coils of relay 86 are in the cross wire 96 of the Wheatstone bridge. A branch circuit 97 leads from wire 92 through coils of polarizing magnet 88 to a contact stop 98 of relay 87; and a similar circuit 99 leads from wire 93 through coils of polarizing magnet 88 to an opposite contact stop 100 of relay 87. Sounder 11 is in one side of the bridge circuit, being in the conductor 99 in the arrangement shown, and in the opposite side of the bridge there is a compensating resistance.

Normally there is a current from battery 89 through wires 91 and 93 of the bridge, and one magnet of relay 87, to contact stop 95 of relays 85 and 86 and thence through rheostat 101 to return; and there is a corresponding current through wires 90, 92 and 97 on the opposite side of the bridge, magnet 88, stop 98 of relay 87, and rheostat 101' to return. The resistance of rheostat 101' will be adjusted so that sufficient current will flow through the cross wire 96 to hold the connected armatures of relays 85 and 86 against the current of whichever of batteries G and H is of the polarity to affect instrument 8; (and correspondingly, the similar rheostat of the Wheatstone bridge of instrument 7 will be so adjusted that said instrument is not affected by current from either of said batteries G and H). If, however, battery E be placed to the line momentarily by transmitter 1, the current from this battery, acting on relay 85 of instrument 8, overcomes the effect of the current flowing through the cross wire 96 and the coils of relay 86, causing the connected armatures of said relays to break contact with stop 95; and the instant such contact is broken a strong current passes from wire 91 through the cross wire 96 and thence to wire 92, wire 97, etc., back to battery, this current being of the proper direction to carry over the armatures of relays 85 and 86, even if the pulse in the line circuit which started such motion ceases before such motion is completed. The instant the connected armatures of relays 85 and 86 make contact with the contact stop 94 a circuit is completed from wire 92 through the right-hand magnet of relay 87, thus deflecting the armature of relay 87 to the right; and the instant the armature of said latter relay reaches its right-hand stop, the direction of the current through the polarizing magnet 88 is reversed, so that the conditions prevailing in the circuits of the instrument prior to the transmission of the actuating pulse through the line are restored, except that all of the armatures are now to the right, and owing to the reversal of the polarity of magnet 88, a current pulse of the direction which caused the armatures to move to the right will now cause them to move back to the left, to their first positions.

From the above, it will be seen that the operation of the instruments shown in Figs. 1 and 2 is as follows:—Supposing key 3 of transmitter 1, for example, to be depressed, the armature of transmitter 1 will be attracted, causing the armature of relay 22 to move to the left; and during such movement of said armature, the neutralizing coil 40 of magnet M is deënergized, so that magnet M attracts its armature, closing contact 17 and placing battery E to the line, and breaking the contact between levers 44 and 45 and so cutting out, momentarily, whichever of batteries G and H was to the line. The current pulse thereby transmitted causes the magnet of relay 66 (Fig. 2) to attract its armature, thus preventing instrument 9 from being affected by said pulse, and operates instrument 8, moving the armatures of relays 85 and 86 to the right, and so closing the circuit of sounder 11. Instrument 7 is not affected. This current pulse from battery E continues only while the armature of relay 22 is moving to the left, the duration of which interval is regulated by adjusting the position of weight 43, or by adjusting the stops, or both. As soon as said armature has reached its left-hand stop 38, neutralizing coil 40 of magnet M is again energized, neutralizing the effect of coil 25, and so causing walking beam 15 to return to its normal central position. When key 3 is released, and the armature of transmitter 1 is retracted, the armature of relay 22 moves from left to right, causing magnet M to attract its armature a second time, thus again placing battery E to the line momentarily, and thus reversing the instrument 8 again, breaking the circuit through sounder 11. The duration of the interval between each two pulses produced in the line by depressing and then releasing the key 3 determines whether the signal transmitted is a dot or a dash, as in ordinary telegraphy; said key being operated, in fact, the same as such keys are customarily operated, and sounder 11 giving dot and dash signals just as the sounder of an ordinary telegraph system gives such signals.

Transmitter 2 may be operated simultaneously with transmitter 1, or during the interval between the signals, or between the pulses of a signal, transmitted by transmitter 1, without interference. Should the neutralizing coil 40 of magnet N have its circuit interrupted while the corresponding coil of magnet M is deënergized, the attraction of walking beam 15 to magnet N will be delayed momentarily, until the pulse due to the operation of the transmitter 1 is complete; after which the walking beam will move toward magnet N, placing battery F to the line, and breaking the circuit from transmitter 5 at contact 46. Should magnets M and N be energized simultaneously, magnet M will operate the walking beam first, because of the bias in favor of magnet M. Interference between the two transmitters under any possible conditions is therefore avoided. It will be seen that in the event of transmitters 1 and 2 being operated at exactly the same instant the pulses sent through the operation of transmitter 1 will always have precedence over those sent through the operation of transmitter 2.

Should transmitter 5 be operated while neither battery E nor battery F is to the line, the line current will be reversed and instrument 9 will be operated, the same as if transmitters 1 and 2 were not present. If transmitter 5 be operated while either battery E or battery F is to the line, the operation of instrument 9 will be delayed momentarily, until walking beam 15 is in its normal position, and then the substitution of battery H for battery G, or vice versa, effected by the operation of transmitter 5, will be effective to reverse instrument 9. The interval during which a signal from any one of the three transmitters may be delayed because of the operation of one of the other transmitters is always much shorter than a very short dot, and therefore no mutilation of signals results.

Switch 48 is provided to cut out the battery G or H, when balancing the line and artificial line, at the distant end, and also to cut out transmitter 5 when only a duplex or quadruplex system is desired.

In the arrangement shown in Fig. 1, contact devices are operated mechanically by magnets M and N and their armatures, to cut out transmitter 5 momentarily while the armatures of said magnets are attracted by their magnets, and for connecting batteries E and F momentarily to the line. I prefer, however, to use, instead of such mechanically operated contacts, separate relays, O and P, having magnets corresponding to magnets M and N and controlled by the same circuits. This is illustrated in Fig. 3, in which figure the two opposing coils of relays O and P have the same reference numerals as the corresponding coils of magnets M and N. Obviously, the corresponding coils of magnets M and O, and N and P, may be caused to actuate their armatures alike, by connecting corresponding coils either in series circuit or in multiple circuit. I prefer, however, the multiple connection, which is illustrated in Fig. 3. Coil 25 of relay O is connected in multiple with the corresponding coil of magnet M by a wire 102, and coil 40 of relay O is connected in multiple with coil 40 of magnet M by a wire 103. The effect of the use of the two relays O and P operating contact points controlling the connection to the line of the high-potential batteries is obviously the same as the effect produced by mechanically-operated contact points, but the arrangement shown in Fig. 3 is more rapid in operation.

Fig. 4, which is similar to Fig. 3, illustrates improved means for producing in the line currents of the different strengths required for the transmission of three messages, simultaneously, in the same direction. The key 6 by which the third message is transmitted controls a transmitter 104, and in connection with such transmitter, six batteries of different strengths and directions are provided. For purposes of illustration, definite relative strengths are assumed for these batteries, and numerals opposite the several batteries indicate their relative strengths. As will be seen, there are positive and negative batteries of each of the following strengths: 100, 300 and 400. The two batteries of strength 100 are connected, one to the armature and the other to the contact stop 105 of said transmitter, and the corresponding contact tongue 106 is connected through wire 49, switch 107, and wire 47, if said switch be in the position shown, to that contact stop, 108, of relay O, with which the armature of said relay is in contact normally, and thence is connected through wire 109 to the corresponding contact stop 110 of relay P, and through the armature of that relay to line. This is the normal condition of the apparatus, and whether the positive or the negative battery of strength 100 is to the line will depend upon the position of key 6. Similarly, the positive batteries of strengths 300 and 400 are connected, the one to an armature contact piece 111 and the other to a contact stop 112 of transmitter 104, the corresponding contact tongue 113 being connected through switch 107, to contact stop 114 of relay O; and the negative batteries of strengths 300 and 400 are similarly connected, the one to an armature contact piece 115 of the transmitter and the other to a contact stop 116, the corresponding contact tongue 117 being connected through switch 107 to the contact stop 118 of relay P. It will be seen that with this arrangement, the operation of transmitter 104 while transmitters 1 and 2 are idle, results in the substitution of the positive battery of strength 100 for the negative battery of that strength, or vice versa; that the depression or release of key 3 while key 6 is up, and the consequent attraction of the armature of relay O, results in the placing of the positive battery of strength 300 to the line, momentarily, the positive battery of strength 100 being cut out for the instant at contact 108; that the depression or release of key 3 while key 6 is down results in the placing of the positive battery of strength 400 to the line momentarily, the negative battery of strength 100 being cut out momentarily, at contact 108; that the depression or release of key 4 while key 6 is up, results in the placing to the line, momentarily, of the negative battery of strength 400, the positive battery of strength 100 being cut out momentarily; and that the depression or release of key 4 while key 6 is down results in the placing to the line, momentarily, of the negative battery of strength 300, the negative battery of strength 100 being cut out, momentarily. In other words, when one of transmitters 1 and 2 operates, the current from transmitter 104 is cut out momentarily, and a current of strength 300 or strength 400 is placed to the line according as the charge of the line is of the same sign as that current, or of the opposite sign; the greater current strength being required when the pulsatory current must overcome a line charge of opposite sign. Switch 107 corresponds to switch 48 of Fig. 1.

Fig. 5 shows transmitting apparatus and circuits similar to those shown in Fig. 3, except that the third transmitter, 5, has been omitted, the transmitting apparatus being adapted, therefore, for a quadruplex system, and except that the said transmitting apparatus contains the well-known "leak", which here is employed to automatically correct, in case for any reason a pulse should fail to reach the corresponding receiving instrument, so that, but for correction, the sounder would go into "back stroke". The pulsatory current receiving instruments 7 and 8 used with this apparatus should be biased, by adjustment of the contact stops so that the armature of relay 85 approaches one magnet more nearly than the other, or otherwise, so that it will take a greater current to move their armatures from normal, for example, than to move them back to normal. The transmitters 1 and 2 have, in addition to the usual contact pieces, an armature contact piece 119, a contact stop 120, and a tongue 121. The battery, E or F, is connected to 119, by a circuit in which there is a relatively small resistance 123. The battery is also connected, through a much higher resistance 124, to stop 120, and just beyond resistance 124 there is a leak-connection containing a resistance 125. It will be seen that when key 3, for example, is depressed, the full strength of battery E is put to the line, (high resistance 124 and leak 125 being cut out), producing a relatively strong pulse; but that when key 3 breaks, the battery E is put to the line through resistance 124, and much of the current passes through the leak 125, so that a much smaller pulse is produced in the line. The resistances are so regulated, and the receiving instruments so adjusted, that this weaker pulse is not strong enough to move the armature of the corresponding receiving instrument from normal position, but is only strong enough to move it back to normal position.

Fig. 6 is a view, similar to Fig. 2, but with the local circuits omitted for the sake of simplicity, showing how the receiving apparatus may be adapted for systems of transmission in both directions simultaneously. The method illustrated is the well-known "differential duplex", involving an artificial line circuit, L', in addition to the main line circuit, L; the magnets through which these artificial and line circuits pass being differentially wound, so that outgoing signals do not affect said magnets, but only incoming signals.

Fig. 7 illustrates an alternative and preferred method of connecting instruments 7, 8 and 9 to the line circuit. Only the magnets 85, 66 and 60 of these instruments are indicated, said magnets being the main actuating elements of said instruments. In Fig. 2 these magnets of the two instruments are shown connected to the line circuit in series. Instead, I prefer to connect them in multiple by branches L'' of the line circuit, with respect to each other but in series with instrument 9, as shown in Fig. 7. It is obvious that in so far as the receipt of signals is concerned, the effect is the same as the series arrangement shown in Fig. 2.

In Fig. 8 I show alternative receiving instruments which I may employ, the receiving instruments 7' and 8' (corresponding to 7 and 8 of Fig. 2) being constructed as described in my said Patent No. 778,177, and the third receiving instrument, 9', involving similar principles. Each of instruments 7' and 8' consists of three sub-relays, viz., a main relay 126, through which the line circuit passes, a secondary relay 127, and a reversing relay 128. The armatures of relays 126 and 127 are mechanically connected so as to move together. Each of instruments 7' and 8' has two local batteries, 129 and 130, the poles of which are oppositely placed. The positive pole of battery 129 is connected to the left-hand contact stop of the connected armatures of relays 126 and 127, and to the corresponding stop of relay 128 and the negative pole of battery 130 is similarly connected to the corresponding right-hand contact stops of relays 126, 127 and 128, through a sounder, 10 or 11, as the case may be. One of the two connected armatures of relays 126 and 127 is connected to a conductor 131 leading through coils of relay 128 to a return conductor 132, connected to a conductor 133 which connects the negative pole of battery 129 and the positive pole of battery 130. When battery 129 energizes this circuit of conductor 131 the armature of relay 128 is moved, or held, to the left; and when battery 130 energizes the circuit, said armature is moved, or held, to the right. A branch conductor 134 leads from conductor 131 through coils of relay 127 to return conductor 132; and these coils of relay 127, when energized by battery 129, tend to hold the two connected armatures to the left; while when the coils are energized by battery 130, they tend to hold the connected armatures to the right.

Relays 127 and 128 have their armatures magnetized by permanent magnets. The armature of relay 126, however, is energized by an electro-magnet 135, the polarity of which is reversed by the relay 128, when it operates. A branch conductor 136 passes through coils of relay 127 which oppose those to which conductor 134 is connected, and through an adjusting rheostat 137. The resistance of this rheostat is so adjusted that normally the coils of relay 127 almost neutralize each other, the magnets having merely sufficient strength to hold the armatures stationary against the effects of leakage or induction currents in the line. When a signaling current of the proper direction passes through the line, however, the connected armatures are deflected, and as soon as they break contact with their stop, circuit 134 is broken, and the current in circuit 136, aided by the main line current, if the current pulse therein continues long enough, carries the connected armatures over into contact with their right-hand stop. As soon as such contact is completed, the circuit 134 is reëstablished, but this time the current therein flows in the opposite direction, being derived from battery 130. The connected armatures are then held, and relay 128 is reversed, thus establishing the conditions which existed at first, except that the armatures of relays 126 and 127 are now to the right. When relay 128 is reversed, the polarity of magnet 135 is reversed, so that a succeeding current pulse of the direction which caused the operation of the instrument, will deflect the connected armatures back to their first or left-hand position.

One of the two instruments 7' and 8' is arranged to respond only to positive current pulses, and the other only to negative current pulses. The same principles are involved in instrument 9'. Besides the main line relays 60 and 66, the functions of which in general are the same as those of the similarly numbered relays in Fig. 2, the instrument comprises two other relays, 138 and 139, and oppositely arranged batteries, 140 and 141. The armature of relay 60 is connected to the armature of relay 66, while the contact points of relay 60 are connected, one to the positive pole of battery 140, and the other to the negative pole of battery 141. The rear stop of relay 66 is connected to a circuit 142 leading through coils of relay 138 to a return conductor 143. The armature of relay 138 is connected to two circuits, 144 and 145, of which 144 passes through the coils of relay 139 to the return conductor 143, and 145 passes through coils of relay 138 to said return conductor. One contact stop of relay 138 is connected to the positive pole of battery 140, and the other to the negative pole of battery 141. The two contact stops of relay 139 are likewise connected to the same battery poles, while the armature of said relay is connected to a circuit 146 passing through further coils of relay 138 and through a rheostat 147. Normally, the current from battery 140 through circuit 142 tends to hold the armature of relay 138 to the left, as does the current in circuit 145, while the current in circuit 146 partly neutralizes the effect of the current in the other circuits of said relay. When, through the reversal of the line polarity, the armature of line relay 60 is reversed, current from battery 141 passes through circuit 142; and this current, being of opposite direction to that which at first flowed through said circuit, joins with the current in circuit 146 to overcome the effect of the current in circuit 145. As soon as the armature of relay 138 begins to move to the left, circuit 145 is broken, to be reëstablished from battery 141 when the armature reaches its right-hand stop. Relay 139 is then reversed, and the condition existing in the instrument at the beginning is reëstablished, with the armatures of both relays 138 and 139 at the right. Upon a further reversal of line relay 60 the armatures of relays 138 and 139 are moved to the left, in the same manner. Relay 66 acts to prevent mutilation of the signals of instrument 9' by pulsatory currents such as operate instruments 7' and 8'.

It will be seen that instruments 7' 8' and 9' are in effect the same as instruments 7, 8 and 9 of Fig. 2, differing only in the local circuits of the instruments.

It will be obvious that my invention herein illustrated and described is susceptible of numerous variations and modifications without departing from the spirit and scope thereof; further, that certain parts may be used alone or with other parts of different construction. I do not limit myself, therefore, to the particular details of instruments, circuits, and details of construction herein described. Further, it will be obvious that, broadly speaking, the effect of a pulsatory break in the line circuit, or a pulsatory decrease in current strength, is equivalent to a pulsatory completion of the circuit or a pulsatory increase in current strength therein. I do not limit myself, therefore, to the transmission of signals by pulsatory increases of current strength, but may employ instead pulsatory decreases of current strength, which I regard as the mere equivalent of pulsatory increases, and as falling within the following claims.

What I claim is:—

1. The herein described method of transmitting simultaneous telegraphic messages in the same direction, through a single circuit, which consists in transmitting the signals of one message by fluctuations of a relatively weak current and in transmitting the signals of two other messages by relatively stronger current impulses occurring in pairs, one at the beginning and the other at the end of each signal, the signals of one message being transmitted by positive pulses and the signals of the other message by negative pulses.

2. The herein described method of transmitting simultaneous telegraphic messages in the same direction, through a single circuit, which consists in transmitting the signals of one message by reversals of a relatively weak current and in transmitting the signals of two other messages by impulses of relatively stronger current, said impulses occurring in pairs, one at the beginning and the other at the end of each signal, the signals of one message being transmitted by positive pulses and the signals of the other message by negative pulses, said pulses being of too brief duration to prevent the effective transmission and receipt of the signals of the first message.

3. The herein described method of transmitting simultaneous telegraphic messages through a single circuit, which consists in transmitting three messages in each direction, one by fluctuations of a relatively weak current and the other two by relatively stronger current impulses occurring in pairs, one at the beginning and the other at the end of each signal, the signals of one message being transmitted by positive pulses and the signals of the other message by negative pulses, and in avoiding interference between messages in opposite directions by a method of duplex telegraphy.

4. The herein described method of transmitting simultaneous telegraphic messages through a single circuit, which consists in transmitting three messages in each direction, one by reversals of a relatively weak current and the other two by impulses of relatively stronger current, said impulses occurring in pairs, one at the beginning and the other at the end of each signal, the signals of one message being transmitted by positive pulses and the signals of the other message by negative pulses, and in avoiding interference between messages in opposite directions by a method of duplex telegraphy.

5. A telegraph system comprising in combination a line conductor, means for supplying current to the line, and two double current pulsatory transmitting instruments, one for each direction of current, controlling relatively strong currents, and a further transmitting instrument controlling a relatively weak current and adapted by its operation to produce fluctuations therein, said pulsatory transmitting instruments arranged to produce current pulses too brief to prevent the effective transmission and receipt of signals from said third transmitter.

6. A telegraph system comprising in combination a line conductor, means for supplying current to the line, and two double current pulsatory transmitting instruments, one for each direction of current, controlling relatively strong currents, and a further transmitting instrument controlling a relatively weak current and adapted by its operation to reverse the same, said pulsatory transmitting instruments arranged to produce current pulses too brief to prevent the effective transmission and receipt of signals from said third transmitter.

7. A telegraph system comprising in combination a line conductor, means for supplying current to the line, and two double current pulsatory transmitting instruments, one for each direction of current, controlling relatively strong currents, a further transmitting instrument controlling a relatively weak current and adapted by its operation to produce fluctuations therein, said pulsatory transmitting instruments arranged to produce current pulses too brief to prevent the effective transmission and receipt of signals from said third transmitter, and means for interrupting current from said third transmitter during the transmission of pulses by said first two transmitters.

8. A telegraph system comprising in combination a line conductor, means for supplying current to the line, and two double current pulsatory transmitting instruments, one for each direction of current, controlling relatively strong currents, and a further transmitting instrument controlling a relatively weak current and adapted by its operation to reverse the same, said pulsatory transmitting instruments arranged to produce current pulses too brief to prevent the effective transmission and receipt of signals from said third transmitter.

9. A telegraph system comprising in combination a line conductor, means for supplying current to the line, and two double current pulsatory transmitting instruments, one for each direction of current, controlling relatively strong currents, a further transmitting instrument controlling a relatively weak current and adapted by its operation to produce fluctuations therein, said pulsatory transmitting instrument arranged to produce current pulses too brief to prevent the effective transmission and receipt of signals from said third transmitter, means for interrupting the current from said third transmitter during transmission of pulses by said first two transmitters, and selecting means preventing conflict between said first two transmitters.

10. A telegraph system comprising in combination a line conductor, means for supplying current to the line, and two double current pulsatory transmitting instruments, one for each direction of current, controlling relatively strong currents, a further transmitting instrument controlling a relatively weak current and adapted by its operation to reverse the same, said pulsatory transmitting instruments arranged to produce current pulses too brief to prevent the effective transmission and receipt of signals from said third transmitter, means for interrupting the current from said third transmitter during the transmission of pulses by said first two transmitters, and selecting means preventing conflict between said first two transmitters.

11. A telegraph system comprising in combination a line conductor, means for supplying current to the line, and two double current pulsatory transmitting instruments, one for each direction of current, controlling relatively strong currents, a further transmitting instrument controlling a relatively weak current and adapted by its operation to produce fluctuations therein, said pulsatory transmitting instruments arranged to produce current pulses too brief to prevent the effective transmission and receipt of signals from said third transmitter, and selecting means preventing conflict between said first two transmitters.

12. A telegraph system comprising in combination a line conductor, means for supplying current to the line, and two double current pulsatory transmitting instruments, one for each direction of current, controlling relatively strong currents, a further transmitting instrument controlling a relatively weak current and adapted by its operation to produce current pulses too brief to prevent the effective transmission and receipt of signals from said third transmitter, and selecting means preventing conflict between said first two transmitters.

13. In a telegraph system, the combination with a line conductor, means for supplying current to the line, and two double current pulsatory transmitting instruments, one for each direction of current, controlling relatively strong currents, and a further transmitting instrument controlling a relatively weak current and adapted by its operation to produce fluctuations therein, said pulsatory transmitting instruments arranged to produce current pulses too brief to prevent the effective transmission and receipt of signals from said third transmitter, of two single-direction double current receiving instruments, both arranged to respond only to said stronger currents, one operated only by positive pulses, the other only by negative pulses, and each adapted to be changed from, and restored to, normal condition, by alternate current pulses of proper direction, and a third receiving instrument, arranged to respond only to the current changes produced by said third transmitter, and not to be operated by current pulses transmitted by said first two transmitters.

14. In a telegraph system, the combination with a line conductor, means for supplying current to the line, and two double current pulsatory transmitting instruments, one for each direction of current, and a further transmitting instrument controlling a relatively weak current and adapted by its operation to reverse the same, said pulsatory transmitting instruments arranged to produce current pulses too brief to prevent the effective transmission and receipt of signals from said third transmitter, of two single-direction double current receiving instruments, both arranged to respond only to said stronger currents, one operated only by positive pulses, and the other only by negative pulses, and each adapted to be changed from, and restored to, normal condition, by alternate current impulses of proper direction in the line, and a third receiving instrument, arranged to respond only to the current changes produced by said third transmitter, and not to be operated by current pulses transmitted by said first two transmitters.

15. In a telegraph system, transmitting means for one station in a line circuit comprising in combination a relay having an armature and opposed normally energized magnet coils adapted to cause deflection of said armature in opposite directions, two transmitters and means operated thereby for disturbing the balance of the coils of said relay at the beginning and again at the end of each signal, said transmitters affecting oppositely the balance of said coils and causing the deflection of the armature in opposite directions.

16. In a telegraph system, the combination with a line circuit, and transmitting means for one station thereof, comprising a relay having an armature and opposed normally energized magnet coils adapted to cause deflection of said armature in opposite directions, two transmitters and means operated thereby for disturbing the balance of the coils of said relay at the beginning and again at the end of each signal, said transmitters affecting oppositely the balance of said coils, of receiving relays arranged to be changed from and restored to normal conditions by alternate pulses produced by the operation of said relay of said transmitting means.

17. In a telegraph system, transmitting means for one station in a line circuit comprising in combination a relay having an armature and opposed normally energized magnet coils, two transmitters, two relays, one for each transmitter, each comprising an armature and opposed magnet coils arranged to be energized alternately by the corresponding transmitter, said last-named relays arranged to affect oppositely the balance between the coils of said first relay, and thereby to cause the deflection of the armature of said first relay in opposite directions.

18. In a telegraph system, transmitting means for one station in a line circuit comprising in combination a relay having an armature and opposed normally energized magnet coils, two transmitters, two relays, one for each transmitter, each comprising an armature and opposed magnet coils arranged to be energized alternately by the corresponding transmitter, said last-named relays arranged to affect oppositely the balance between the coils of said first relay, and thereby to cause the deflection of the armature of said first relay in opposite directions, said first relay biased in favor of one of its magnet coils.

19. In a telegraph system, the combination with a relay comprising an armature and two magnets opposing each other with respect thereto, and contact mechanism operated by movement of said armature in either direction from its mid-position, of two transmitters, one for each of said magnets, and means operated by each for causing the corresponding magnet to attract the common armature momentarily at the beginning and again at the end of each signal of said transmitter.

20. In a telegraph system, the combination with a relay comprising an armature and two magnets opposing each other with respect thereto, said armature arranged to produce in a line circuit a current of one polarity when moved in one direction from mid-position, and to produce in such line a current of the opposite polarity when moved in the opposite direction from such mid-position, of two transmitters, one for each of said magnets, and means operated by each for causing the corresponding magnet to attract the common armature momentarily at the beginning and again at the end of each signal of said transmitter.

21. In a telegraph system, the combination with a relay comprising an armature and two magnets opposing each other with respect thereto, and contact mechanism operated by movement of the armature in either direction from its mid-position, each magnet comprising opposing magnet coils normally energized, of two transmitters, one for each of said magnets, and means operated by each for disturbing the balance of the coils of such corresponding magnet at the beginning and again at the end of each signal of such transmitter.

22. In a telegraph system, the combination with a relay comprising an armature and two magnets opposing each other with respect thereto, separate transmitters for said magnets, and means operated thereby for causing said magnets to operate said armature, and means operated by said armature for producing in a line circuit a positive or negative current pulse, according to the direction of motion of said armature from mid-position, of other signal transmitting means comprising a third transmitter and means operated thereby controlling a line current of different strength from that of the pulses produced by the operation of the first mentioned transmitter.

23. In a telegraph system, the combination with a relay comprising an armature and two magnets opposing each other with respect thereto and comprising each two opposed normally energized magnet coils, separate transmitters for said magnets, means operated by each transmitter arranged to disturb the balance of the coils of the corresponding magnet at the beginning and again at the end of a signal of that transmitter, and means operated by said armature for producing in a line circuit a positive or a negative current pulse, according to the direction of motion of said armature from mid-position, of other signal transmitting means comprising a third transmitter and means operated thereby controlling a line current of different strength from that of the pulses produced by the operation of the first mentioned transmitter.

24. In a telegraph system, the combination with a relay comprising an armature and two magnets opposing each other with respect thereto, separate transmitters for said magnets, and means operated thereby for causing said magnets to operate said armature, of two other relays arranged to control a line circuit, said two relays arranged to produce a positive or a negative pulse in said line according to which of said relays is operated, said first relay arranged to operate the one or the other of said relays according to the direction of motion of its armature from mid-position, and a third transmitter and means operated thereby controlling a weaker line current, said last two relays arranged to interrupt the current of said third transmitter when they operate.

25. In a telegraph system, the combination with a relay comprising an armature and two magnets each having opposing and normally energized magnet coils, separate transmitters for said magnets, and means operated thereby for disturbing the balance of the coils of the corresponding magnet, of two other relays arranged to control a line circuit, said relays each comprising two opposed normally energized magnet coils, said first relay arranged to disturb the balance of the coils of one or the other of said last two relays according to the direction of motion of its armature from mid-position, said last two relays arranged to produce a positive or a negative pulse in the line circuit according to which of said relays is operated, and a third transmitter and means operated thereby controlling a weaker line current, said last two relays arranged to interrupt the current of said third transmitter when they operate.

26. In a telegraph system, the combination with a line conductor, two double current pulsatory transmitting instruments, one for each direction of current, controlling currents of approximately the same strength, receiving instruments responding thereto, and a third transmitter controlling a current of different strength, of a receiving instrument responding to said third transmitter and means preventing operation thereof by current pulses from said first two transmitters.

27. In a telegraph system, the combination with a line conductor, two double current pulsatory transmitting instruments, one for each direction of current, controlling currents of approximately the same strength, receiving instruments responding thereto, and a third transmitter controlling a current of different strength, of a receiving instrument responding to said third transmitter, and a line relay, operated by the current pulses of said first two transmitters, and preventing operation of said third receiving instrument thereby.

28. In a telegraph system, the combination with a line conductor, two double current pulsatory transmitting instruments, one for each direction of current, controlling relatively strong currents, receiving instruments responding thereto, and a third transmitter controlling a relatively weaker current, of a receiving instrument responding to said third transmitter, and a line relay, adjusted to be operated by the pulses of said first two transmitters, and arranged when so operated to prevent operation of said third receiving instrument thereby.

29. In a telegraph system, the combination with a line conductor, two double current pulsatory transmitting instruments, one for each direction of current, controlling relatively strong currents, receiving instruments responding thereto, and a third transmitter controlling a relatively weaker current and arranged to reverse the same, of a receiving instrument responding to said third transmitter, and comprising a line polar relay, a local circuit controlled thereby and a secondary relay controlled by said local circuit, and means operated by the pulses of said first two transmitters, for interrupting said local circuit momentarily during the transmission of each of said pulses.

30. In a telegraph system, transmitting means for one station of a telegraph line comprising in combination three transmitting devices, two such devices being double current pulsatory transmitters, and the third a non-pulsatory transmitter, said pulsatory transmitters controlling currents of different directions, and the third transmitter controlling a current of strength different from that of the pulsatory transmitters.

31. In a telegraph system, transmitting means for one station of a telegraph line comprising in combination three transmitting devices, two such devices being double current pulsatory transmitters, and the third a non-pulsatory transmitter, said pulsatory transmitters controlling currents of different directions, and the third transmitter controlling a current of strength different from that of the pulsatory transmitters, and selecting means preventing interference between said pulsatory transmitters.

32. In a telegraph system, transmitting means for one station of a telegraph line comprising in combination three transmitting devices, two such devices being double current pulsatory transmitters, and the third a non-pulsatory transmitter, said pulsatory transmitters controlling currents of different directions, and the third transmitter controlling a current of strength different from that of the pulsatory transmitters, and selecting means preventing interference between said pulsatory transmitters and comprising means for interrupting circuit of said third transmitter during transmission of a pulse by either of the pulsatory transmitters.

33. In a telegraph system, transmitting means for one station of a telegraph line comprising in combination two double current pulsatory transmitters and a third transmitter, said pulsatory transmitters controlling currents of different directions and comprising means for disconnecting the third transmitter from a line circuit during the transmission of a pulse by either pulsatory transmitter, said third transmitter having transmitting means controlling one strength of current, and having also means controlling the currents of said pulsatory transmitters, and giving to that pulsatory transmitter which controls current of the direction opposite that which said third transmitter tends at the instant to produce in the line, current of greater strength than to the other pulsatory transmitter.

34. In a telegraph system, transmitting means for one station of a telegraph line comprising in combination means for supplying current of three different strengths and of different directions, and three transmitting devices, two such transmitting devices being double current pulsatory transmitters controlling currents of different directions, the third transmitter having transmitting contacts controlling the lowest strength of current, and having other contacts controlling the currents of the other two strengths, and connecting the current of intermediate strength to that pulsatory transmitter the current controlled by which is of the same polarity as that produced at the time by the transmitting contacts of the third transmitter, and connecting the current of the third strength to the other pulsatory transmitter, said pulsatory transmitters comprising means for disconnecting the transmitting contacts of said third transmitter from the line during the transmission of a pulse by either of said pulsatory transmitters.

35. In a telegraph system, a double current pulsatory transmitter comprising a relay having a polarized armature and opposing magnet coils, means for energizing one of said coils at the beginning and the other at the end of a signal, and means for connecting a source of electrical energy to a line circuit during the travel of said armature from one side to the other.

36. In a telegraph system, the combination with a double pulsatory-current transmitter, adapted to produce a current pulse at the beginning and again at the end of each signal, and a pulsatory-current receiving instrument arranged to be changed from, and restored to, normal condition by alternate current pulses, of means for correcting automatically for loss of a pulse.

37. In a telegraph system, the combination with a line circuit, and a double current receiving instrument biased to require a stronger current to operate it in one direction than in the other, of a double current transmitter arranged to produce a stronger current pulse at one end of a signal than at the other.

38. In a telegraph system, the combination with a line circuit, and a double current receiving instrument biased to require a stronger current to operate it in one direction than in the other, of a double current transmitter arranged to introduce resistance and a leak at one end of a signal and to exclude the resistance and leak at the other end of the signal.

In testimony whereof I affix my signature, in the presence of two witnesses.

THOMAS BULLITT DIXON.

Witnesses:
LYMAN S. ANDREWS, Jr.,
D. HOWARD HAYWOOD.